United States Patent
Li et al.

(10) Patent No.: US 10,785,353 B1
(45) Date of Patent: Sep. 22, 2020

(54) MOBILE PHONE CAMERA EXTENSION-AND-RETRACTION DEVICE AND MOBILE PHONE

(71) Applicant: SHENZHEN ZHAOWEI MACHINERY & ELECTRONICS CO., LTD., Shenzhen, Guangdong (CN)

(72) Inventors: Ping Li, Guangdong (CN); Fenyong Nan, Guangdong (CN); Dong Xin, Guangdong (CN)

(73) Assignee: SHENZHEN ZHAOWEI MACHINERY & ELECTRONICS CO., LTD., Shenzhen (CN)

(*) Notice: Subject to any disclaimer, the term of this patent is extended or adjusted under 35 U.S.C. 154(b) by 250 days.

(21) Appl. No.: 16/085,583

(22) PCT Filed: Apr. 4, 2018

(86) PCT No.: PCT/CN2018/081846
§ 371 (c)(1),
(2) Date: Sep. 16, 2018

(87) PCT Pub. No.: WO2019/062062
PCT Pub. Date: Apr. 4, 2019

(30) Foreign Application Priority Data

Sep. 27, 2017 (CN) .......................... 2017 1 0888767

(51) Int. Cl.
*F16H 19/04* (2006.01)
*H04M 1/02* (2006.01)
(Continued)

(52) U.S. Cl.
CPC .......... *H04M 1/0264* (2013.01); *F16H 19/04* (2013.01); *F16H 37/041* (2013.01);
(Continued)

(58) Field of Classification Search
CPC ............ H04M 1/0264; H04M 2250/52; H04N 5/2257; F16H 19/04; F16H 37/041; F16H 57/02; F16H 57/082; F16H 2057/02034
(Continued)

(56) References Cited

U.S. PATENT DOCUMENTS 5,305,033 A * 4/1994 Takahashi ........... F21V 33/0052
396/176
5,366,423 A * 11/1994 Mori ........................ F16H 1/28
475/338
(Continued)

FOREIGN PATENT DOCUMENTS

CN 201657118 U 11/2010
CN 103533222 A 1/2014
(Continued)

*Primary Examiner* — Hai V Nguyen

(57) ABSTRACT

A mobile phone camera extension-and-retraction device (100) and a mobile phone, wherein, the mobile phone camera extension-and-retraction device (100) comprises a driving unit (1), a reversing gear mechanism (2), a connecting drive mechanism (3), a control module and a shell (4), the driving unit (1) is controlled to rotate forwardly or reversely by the control module, thereby driving the first planetary pinion (22) or the second planetary pinion (23) of the reversing gear mechanism (2) to mesh with the second drive gear (31) of the connecting drive mechanism (3), and driving the rack member (32) for straightly reciprocating movement, such that the mobile phone camera fixedly connected to the rack member (32) extends or retracts automatically.

20 Claims, 2 Drawing Sheets

(51) Int. Cl.
*H04N 5/225* (2006.01)
*F16H 37/04* (2006.01)
*F16H 57/08* (2006.01)
*F16H 57/02* (2012.01)

(52) U.S. Cl.
CPC ............ *F16H 57/02* (2013.01); *F16H 57/082* (2013.01); *H04N 5/2257* (2013.01); *F16H 2057/02034* (2013.01); *H04M 2250/52* (2013.01)

(58) Field of Classification Search
USPC .................. 455/556.1, 556.2; 396/72, 176
See application file for complete search history.

(56) References Cited

U.S. PATENT DOCUMENTS

| | | | | |
|---|---|---|---|---|
| 5,649,254 A * | 7/1997 | Mori | ................ | F16H 1/28 396/411 |
| 7,212,885 B2 * | 5/2007 | Diaz | ................ | A43D 117/00 345/630 |
| 7,424,214 B2 * | 9/2008 | Kim | ................ | G06K 19/07732 348/14.02 |
| 7,433,721 B2 * | 10/2008 | Kuroda | ................ | H04M 1/0247 379/433.07 |
| 7,471,888 B2 * | 12/2008 | Maeda | ................ | G02B 7/102 348/E5.025 |
| 7,580,625 B2 * | 8/2009 | Dalby | ................ | H04M 1/0208 348/68 |
| 7,581,893 B2 * | 9/2009 | Miramontes | ................ | G03B 17/00 396/448 |
| 7,589,913 B2 * | 9/2009 | Kondo | ................ | G02B 7/102 359/684 |
| 9,451,899 B2 * | 9/2016 | Ritchey | ................ | H04N 5/23203 |
| 9,503,625 B2 * | 11/2016 | Oliveira | ................ | H04N 5/23293 |
| 9,961,243 B2 * | 5/2018 | Oliveira | ................ | H04N 5/23245 |
| 10,033,972 B2 * | 7/2018 | Almomani | ................ | G07C 9/00182 |
| 10,044,920 B2 * | 8/2018 | Brand | ................ | H04N 7/188 |
| 10,567,558 B2 * | 2/2020 | Xu | ................ | H04M 1/0264 |
| 10,602,044 B2 * | 3/2020 | Brand | ................ | H04N 7/185 |
| 2003/0064688 A1 * | 4/2003 | Mizuta | ................ | H04N 7/147 455/90.2 |
| 2003/0171133 A1 * | 9/2003 | Mizuta | ................ | H04M 1/67 455/550.1 |
| 2003/0184880 A1 * | 10/2003 | Kawanabe | ................ | H04N 5/2254 359/704 |
| 2005/0067420 A1 * | 3/2005 | Diaz | ................ | A43D 117/00 221/2 |
| 2005/0200635 A1 * | 9/2005 | Silverbrook | ................ | B41J 13/0027 347/2 |
| 2005/0277439 A1 * | 12/2005 | Brelo | ................ | H04M 1/0243 455/556.2 |
| 2006/0049720 A1 * | 3/2006 | Henderson | ................ | H02N 2/02 310/328 |
| 2006/0124746 A1 * | 6/2006 | Kim | ................ | G06K 19/077 235/472.02 |
| 2007/0009247 A1 * | 1/2007 | Maeda | ................ | H04M 1/0237 396/72 |
| 2007/0206116 A1 * | 9/2007 | Chou | ................ | H04M 1/0264 348/373 |
| 2008/0068730 A1 * | 3/2008 | Matsui | ................ | G02B 7/023 359/726 |
| 2008/0124071 A1 * | 5/2008 | Kim | ................ | G03B 17/04 396/448 |
| 2014/0300809 A1 * | 10/2014 | Oliveira | ................ | H04N 5/2254 348/376 |
| 2015/0189140 A1 * | 7/2015 | Sutton | ................ | G03B 7/093 348/208.1 |
| 2015/0324692 A1 * | 11/2015 | Ritchey | ................ | A61B 5/686 348/14.08 |
| 2016/0021303 A1 * | 1/2016 | Sutton | ................ | H04N 5/238 348/222.1 |
| 2016/0119065 A1 * | 4/2016 | Tobias | ................ | H04B 13/02 348/81 |
| 2016/0255305 A1 * | 9/2016 | Ritchey | ................ | G02B 27/0172 348/14.03 |
| 2018/0091716 A1 * | 3/2018 | Brand | ................ | H04M 1/72569 |
| 2018/0210223 A1 * | 7/2018 | Sharp | ................ | G02B 7/006 |
| 2019/0014247 A1 * | 1/2019 | Brand | ................ | H04N 5/2258 |
| 2019/0058982 A1 * | 2/2019 | Lee | ................ | B60L 53/00 |
| 2019/0215389 A1 * | 7/2019 | Yin | ................ | H04W 88/02 |

FOREIGN PATENT DOCUMENTS

| | | |
|---|---|---|
| CN | 206072676 U | 4/2017 |
| CN | 207166546 U | 3/2018 |
| JP | 0836207 A | 2/1996 |
| JP | 2007159237 A | 6/2007 |
| JP | 2015055757 A | 3/2015 |

\* cited by examiner

US 10,785,353 B1

MOBILE PHONE CAMERA EXTENSION-AND-RETRACTION DEVICE AND MOBILE PHONE

TECHNICAL FIELD

The present application pertains to the field of electronic devices, more particularly, relates to a mobile phone camera extension-and-retraction device and a mobile phone.

BACKGROUND

Photographing function has become a hot direction in the development of mobile phones, on one hand, the mobile phones are thinner and the screen occupation ratio is continuously improved, leaving the width and thickness of the space of the mobile phone camera gradually reduced; on the other hand, the size of the mobile phone camera makes it impossible to continue to shrink with the enhancement of photographing and video functions. Especially the emergence of full-screen mobile phones, which have no width space to install the mobile phone camera and need to hide the mobile phone camera on the back of the screen module, when the photographing function is needed, the mobile phone camera will extend and can take photos after the camera is beyond screen blocking section, and when not needed, the mobile phone camera will return back. Existing mobile phone camera extension-and-retraction devices mainly adopt the manner of manual driving, which cannot achieve extending and retracting automatically.

Technical Problems

Embodiments of the present disclosure aim at: first aspect, providing a mobile phone camera extension-and-retraction device and a mobile phone to solve the technical problem existing in the prior art that the mobile phone camera cannot extend and retract automatically.

Second aspect, providing a mobile phone to solve the technical problem existing in the prior art that the mobile phone camera cannot extend and retract automatically when the mobile phone is photographing.

Technical Solutions

In order to solve above technical problems, the technical solutions adopted by embodiments of the present disclosure are as follows:

First aspect, a mobile phone camera extension-and-retraction device is provided, and the mobile phone camera extension-and-retraction device comprises a driving unit, a reversing gear mechanism, a connecting drive mechanism for driving the mobile phone camera to extend or retract, a control module and a shell;

the driving unit, the reversing gear mechanism, the connecting drive mechanism and the control module are all arranged in the shell, and the control module is electrically connected with the driving unit and may control the driving unit to rotate forwardly or reversely;

the reversing gear mechanism comprises a first drive gear, a first planetary pinion, a second planetary pinion and a planet carrier that are pivotally rotated on the shell, the first drive gear comprises a primary gear and an auxiliary gear, the primary gear is driven to rotate by the driving unit, the auxiliary gear is arranged on the primary gear and rotates coaxially with the primary gear, the planet carrier is pivotally connected to the auxiliary gear through a rotational shaft, the first planetary pinion is pivotally connected to the planet carrier and meshes with the auxiliary gear, the second planetary pinion is pivotally connected to the planet carrier and meshes with the auxiliary gear;

the connecting drive mechanism comprises a second drive gear meshing with the first planetary pinion or the second planetary pinion, and a rack member for fixing the mobile phone camera, the second drive gear is pivotally rotated in the shell, the rack member is movably connected in the shell and extends or retracts relative to the shell when it meshes with the second drive gear, and the first planetary pinion engages with the second drive gear and meshes to drive such that the rack member extends relative to the shell when the driving unit drives the primary gear forwardly, the second planetary pinion engages with the second drive gear and meshes to drive such that the rack member retracts relative to the shell when the driving unit drives the primary gear reversely.

Second aspect, a mobile phone is provided, and the mobile phone comprises the above mobile phone camera extension-and-retraction device.

Beneficial Effects

Compared with the prior art, the beneficial effects of the mobile phone camera extension-and-retraction device, provided in embodiments of the present application, lie in that: the mobile phone camera extension-and-retraction device controls an electric motor to drive the gear transmission mechanism through the control module, adopts two planetary pinions to clockwise, counterclockwise output the driving forces respectively, and finally adopts the rack to drive the mobile phone camera move in a straight line, achieving the purposes that the mobile phone camera extension-and-retraction device extends and retracts automatically, and that the extending and retracting rates are uniform.

The beneficial effects of the mobile phone, provided in embodiments of the present application, lie in that: through the mobile phone adopting the above mobile phone camera extension-and-retraction device, the camera therefore achieves automatic extension and retraction, enhancing the photographing and video functions of the mobile phone, and making the photographing function of the mobile phone more practical.

DESCRIPTION OF THE DRAWINGS

In order to explain the technical solutions in the embodiments of the present application more clearly, the drawings needing to be used in description of the embodiments or the prior art are briefly introduced below, obviously, the drawings described below are merely some embodiments of the present application, for those skilled in the art, other drawings can also be obtained without creative work according to these drawings.

Figure 1:
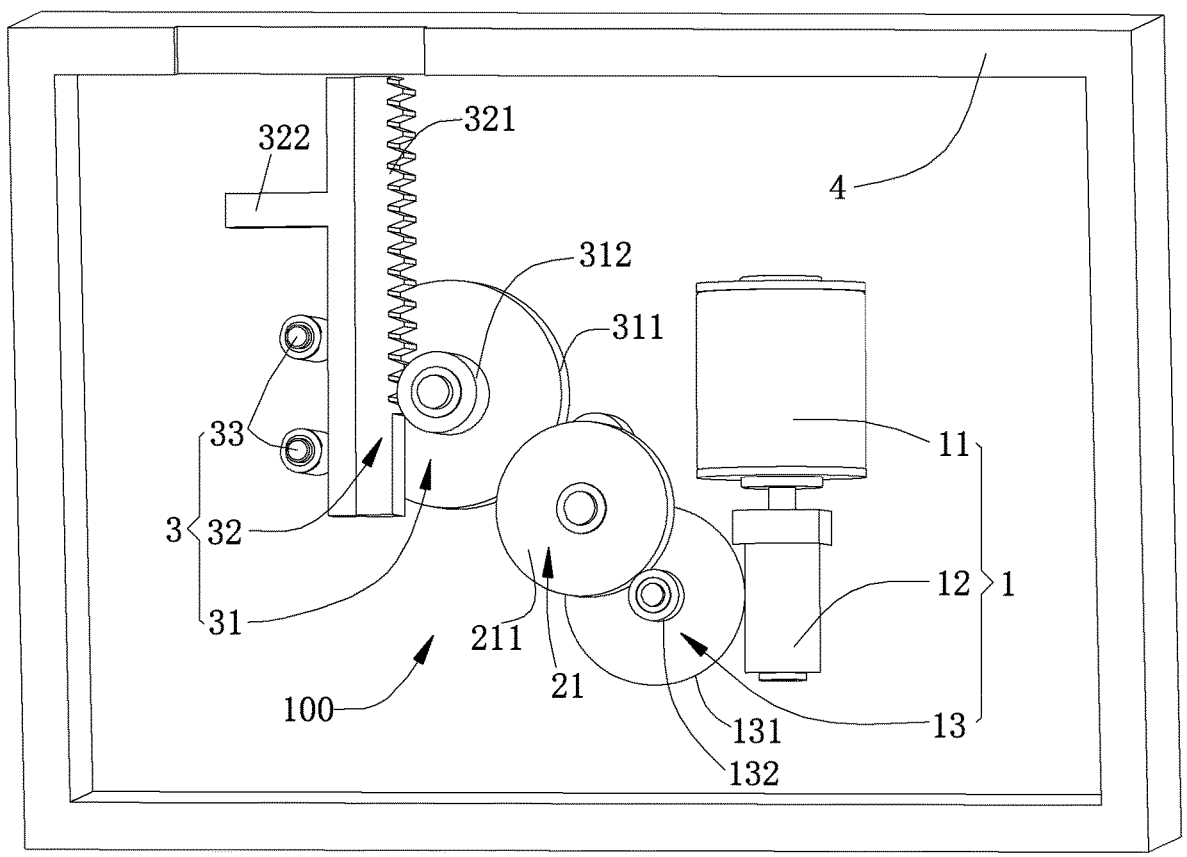
FIG. 1 is a structural schematic view of the mobile phone camera extension-and-retraction device provided in an embodiment of the present application.

Wherein, the reference signs in the drawings are as follows:

100—mobile phone camera extension-and-retraction device; 1—driving unit; 11—electric motor; 12—worm; 13—third drive gear; 131—first auxiliary gear; 132—second auxiliary gear; 2—reversing gear mechanism; 21—first drive gear; 211—primary gear; 212—auxiliary gear; 22—first planetary pinion; 23—second planetary pinion; 24—planet carrier; 25—torsional spring member; 3—connecting drive mechanism; 31—second drive gear; 311—first sub gear; 312—second sub gear; 32—rack member; 321—rack body; 322—fixing portion; 33—guiding shaft; 4—shell.

DETAILED DESCRIPTION OF THE EMBODIMENTS

In order to make the technical problems to be solved, the technical solutions and the technical effects of the present application more clearly, the present application will be further described in detail below with reference to the drawings and embodiments. It should be understood that the specific embodiments described herein are merely for illustrative of the invention, and are not intended to limit the invention.

It should be noted that when an element is referred to as "fixed to" or "arranged to" another element, it may be directly on another element or indirectly on the said another element. When an element is referred to as "connected to" another element, it may be directly connected to another element or indirectly connected to said another element.

It should be appreciated that the terms, such as "above", "below", "front", "back", "left", "right", "vertical", "horizontal", "top", "bottom", "inside", "outside" and the like indicating orientation and position relationships based on the orientation and position relationships shown in the drawings, are merely for conveniently describing the invention and simplifying the description, and are not indicated or suggested that the referring device or element must have specific orientations, and be configured and operated in specific orientations, therefore it cannot be understood as limiting of the invention.

Otherwise, the terms "first", "second" are merely for illustrative purpose, and cannot be understood as indicating or suggesting relative importance, or impliedly pointing out the quantities of the referring technical features. Therefore, the feature limited with "first", "second" may clearly or impliedly comprise one or more said feature. In description of the present application, the meaning of "a plurality of" is two or more, unless there are other clear and specific limitations.

Figure 2:
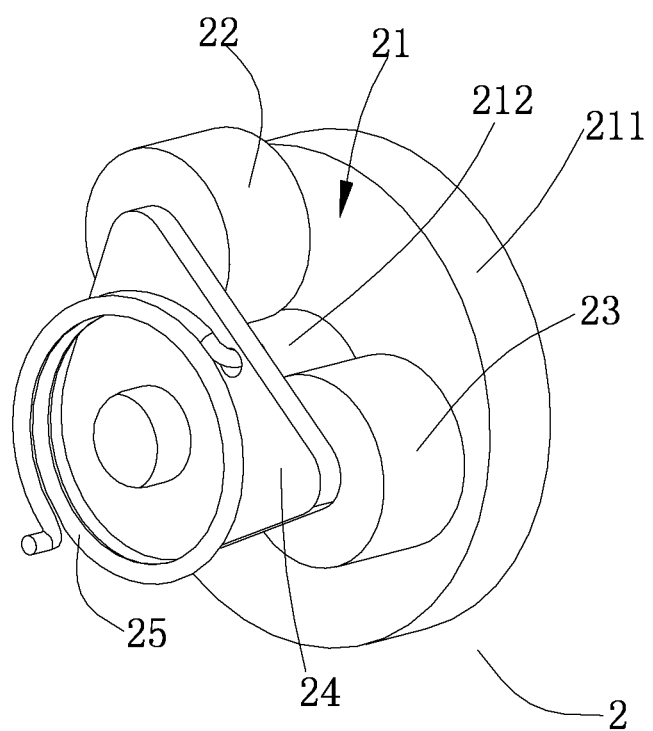
FIG. 2 is a structural schematic view of the reversing gear mechanism of the mobile phone camera extension-and-retraction device provided in an embodiment of the present application.

Please refer to FIG. 1 and FIG. 2 together, the mobile phone camera extension-and-retraction device 100 provided in an embodiment of the present application is now illustrated. The mobile phone camera extension-and-retraction device 100 comprises a driving unit 1, a reversing gear mechanism 2, a connecting drive mechanism 3 for driving the mobile phone camera to extend or retract, a control module and a shell 4, the driving unit 1, the reversing gear mechanism 2, the connecting drive mechanism 3 and the control module are all arranged in the shell 4, and the control module is electrically connected with the driving unit 1 and may control the driving unit 1 to rotate forwardly or reversely; the reversing gear mechanism 2 comprises a first drive gear 21, a first planetary pinion 22, a second planetary pinion 23 and a planet carrier 24 that are pivotally rotated on the shell 4, the first drive gear 21 comprises a primary gear 211 and an auxiliary gear 212, the primary gear 211 is driven to rotate by the driving unit 1, the auxiliary gear 212 is arranged on the primary gear 211 and rotates coaxially with the primary gear, the planet carrier 24 is pivotally connected to the auxiliary gear 212 through a rotational shaft, the first planetary pinion 22 is pivotally connected to the planet carrier 24 and meshes with the auxiliary gear 212, the second planetary pinion 23 is pivotally connected to the planet carrier 24 and meshes with the auxiliary gear 212; the connecting drive mechanism 3 comprises a second drive gear 31 meshing with the first planetary pinion 22 or the second planetary pinion 23, and a rack member 32 for fixing the mobile phone camera, the second drive gear 31 is pivotally rotated in the shell 4, the rack member 32 is movably connected in the shell 4 and extends or retracts relative to the shell 4 when it meshes with the second drive gear 31, and the first planetary pinion 22 engages with the second drive gear 31 and meshes to drive such that the rack member 32 extends relative to the shell 4 when the driving unit 1 drives the primary gear 211 forwardly, the second planetary pinion 23 engages with the second drive gear 31 and meshes to drive such that the rack member 32 retracts relative to the shell 4 when the driving unit 1 drives the primary gear 211 reversely.

When the mobile phone camera extension-and-retraction device 100, provided in the embodiment of the application, controls the driving unit 1 rotating forwardly through the control module, the driving unit 1 drives the primary gear 211 to rotate forwardly, and then the first planetary pinion 22 meshes and rotates with the auxiliary gear 212 rotating axially with the primary gear 211, at this moment, the first planetary pinion 22 rotates about the central axis of the auxiliary gear 212 until contacts with the second drive gear 31, The first planetary pinion 22 meshes with the second drive gear 31, such that the second drive gear 31 rotates circumferentially about the central axis thereof relative to the shell 4 and meshes with the rack member 32, and the rack member 32 moves up straightly relative to the shell to make the mobile phone camera fixed connected to the rack member 32 extend, when the control module controls the driving unit 1 rotating reversely, the driving unit 1 drives the primary gear 211 to rotate reversely, and then the second planetary pinion 23 meshes and rotates with the auxiliary gear 212 rotating axially with the primary gear 211, at this moment, the second planetary pinion 23 rotates about the central axis of the auxiliary gear 212 until contacts with the second drive gear 31, the second planetary pinion 23 meshes with the second drive gear 31, such that the second drive gear 31 rotates circumferentially about the central axis thereof relative to the shell 4 and meshes with the rack member 32, and the rack member 32 moves down straightly relative to the shell to make the mobile phone camera fixed connected to the rack member 32 retract, the whole process achieves automatic control by the control module, and makes the mobile phone camera finish automatic extending out or retracting back stably and fast, which is convenient for operation and practical.

Further, please refer to FIG. 1 and FIG. 2, the planet carrier 24 in the embodiment is triangular planet carrier, the first planetary pinion 22 and the second gear 23 pivot to two opposite angles of the triangular planet carrier respectively. When the first planetary pinion 22 meshes with the second drive gear 31, the second planetary pinion 23 is detached from the auxiliary gear 212, and the rack member 32 moves down straightly relative to the shell 4 at the moment. OR, when the second planetary pinion 23 meshes with the second drive gear 31, the first planetary pinion 22 is detached from the auxiliary gear 212, and the rack member 32 moves down straightly relative to the shell 4 at the moment. Since the diameters of the first planetary pinion 22 and the second planetary pinion 23 are larger than the gap between the auxiliary gear 212 and the second drive gear 31, the first planetary pinion 22 or the second planetary pinion 23 occurs axial rotation only and occurs no orbital revolution when meshing with the second drive gear 31, in this way, the power can be transmitted more stably and uniformly to drive the second drive gear 31, such that the mobile phone camera stably extends or retracts with the rack member 32.

Further, please refer to FIG. 1 and FIG. 2, in the present embodiment, the reversing gear mechanism 2 further includes a torsional spring member 25 for limiting the planet carrier 24 such that both the first planetary pinion 22 and the second planetary pinion 23 are in non-contact state with the second drive gear 31, one end of the torsional spring member 25 is connected to the planet carrier 24, and another end of the torsional spring member 25 is connected to the shell 4, and the torsional spring member 25 has tension after the planet carrier 24 rotates with the first planetary pinion 22 or the second planetary pinion 23, after stopping work, the planet carrier 24 returns to its original position under the action of the tension of the torsional spring member 25, and the first planetary pinion 22 or the second planetary pinion 23 also returns to its original position, ensuring that the first planetary pinion 22 and the second planetary pinion 23 are in a state of being separated from the second drive gear 31 in the non-operating state, such that the mobile phone camera may be manually pushed back to the original position when the mobile phone camera is in the state of extending out.

Further, please refer to FIG. 1 and FIG. 2, in the present embodiment, the second drive gear 31 includes a first sub gear 311 and a second sub gear 312 arranged on the first sub gear 311 and rotates coaxially with the first sub gear 311, the first sub gear 311 meshes with the first planetary 22 gear or meshes with the second planetary 23 gear, the second sub gear 312 meshes with the rack member 32, and compared to the first sub gear 311, the first planetary pinion 22 and the second planetary pinion 23 are smaller in diameter than the first sub gear 311, when the first sub gear 311 is meshed and driven, the rotational speed of the first sub gear 311 is lowered, such that the speed that the rack member 32 drives the mobile phone camera slows down, thereby the mobile phone camera extending out or retracting back stably.

Further, please refer to FIG. 1 and FIG. 2, in the present embodiment, the rack member 32 includes a rack body 321 engaged with the second sub gear 312, the rack body 321 is provided with a fixing portion 322 for fixing the mobile phone camera, and the rack body 321 is engaged with the second sub gear 312, meanwhile, the fixing portion 322 is fixedly coupled with the mobile phone camera to drive the mobile phone camera to extend or retract, the fixing portion 322 is arranged on the rack member 32 and is fixedly connected to the mobile phone camera, strengthening the connection strength between the rack member 32 and the mobile phone camera, and ensuring that the mobile phone camera successfully achieves the actions of extension or retraction.

Further, please refer to FIG. 1 and FIG. 2, in the present embodiment, the connecting drive mechanism 3 further includes a plurality of guiding members 33 disposed side by side in the shell 4, and each guiding member 33 is pivotally connected to the shell 4 and abuts by the rack member 32, the rack member 32 moves linearly under the drive of the second drive gear 31, the guiding members 33 is arranged to enable the rack member 32 to drive accurately the mobile phone camera to extend or retract, and to avoid friction and bumping with the shell 4, moreover, the rack member 32 is in an elongated shape and a certain bending moment is generated during its movement, which causes a certain error when driving the mobile phone camera to extend or retract, the guiding members 33 provided herein also plays a supporting role to ensure accurate movement of the mobile phone camera.

Further, please refer to FIG. 1 and FIG. 2, in the present embodiment, the driving unit 1 comprises a electric motor 11, a worm 12 connected to the spindle of the electric motor 11, and a third drive gear 13 meshing with the worm, the third transmission 13 meshes with the primary gear and the electric motor 11 is used as the power source, the worm 12, which can achieve large torque transmission, is connected to the spindle of the electric motor 11, and the transmission is smooth, the configuration is compact as well, the third drive gear 13 transmits power to the primary gear 211, and reduces the rotation speed, such that the transmission process is more stable, and the transmission is more accurate.

Further, please refer to FIG. 1 and FIG. 2, in the present embodiment, the third drive gear 13 comprises a first auxiliary gear 131 and a second auxiliary gear 132 arranged on the first auxiliary gear 131 and coaxially rotated with the first auxiliary gear 131, the first auxiliary gear 131 meshes with the worm 12, and the second auxiliary gear 132 meshes with the primary gear 211. The gear diameter of the first auxiliary gear 131 is larger than the gear diameter of the second auxiliary gear 132. The second auxiliary gear 132 is engaged with the primary gear 211, and the gear diameter of the primary gear 211 is larger than the gear diameter of the second auxiliary gear 132, such that the transmission speed of the master 211 is reduced, and then the subsequent transmission mechanisms are transmitted stably to enable the mobile phone camera extend or retract smoothly.

Further, please refer to FIG. 1 and FIG. 2, in the present embodiment, the first auxiliary gear 131 is a first auxiliary gear with skew gear teeth, the helical gear has high meshing degree, high transmission efficiency and stable transmission, which can effectively reduce noise of the driving unit 1 and enhance practicability of the mobile phone camera extension-and-retraction device 100, the second sub gear 312 may be selected as a spur gear, and the spur gear is convenient to install and adjust and has high installation precision, which meets the needs of accurate movement of the mobile phone camera.

An embodiment of the present application further provides a mobile phone, not shown in the drawings, and the mobile phone comprises the above mobile phone camera extension-and-retraction device 100.

The mobile phone, provided in the embodiment of the present application, adopts the above mobile phone camera extension-and-retraction device 100, therefore the mobile phone can achieve the functions of automatic extending and retracting of the camera, enhancing practicability of mobile phone and enabling the mobile phone more intelligent.

The above are only preferred embodiments of the present application, and not intended to limit the present application. There may be various modifications and variations of the invention for those skilled in the art. Any modifications, equivalents, and improvements, etc., made within the spirit and principle of the invention, are intended to be included within the scope of the appended claims.

What is claimed is:

1. A mobile phone camera extension-and-retraction device, wherein the mobile phone camera extension-and-retraction device comprises a driving unit, a reversing gear mechanism, a connecting drive mechanism for driving the mobile phone camera to extend or retract, a control module and a shell;

the driving unit, the reversing gear mechanism, the connecting drive mechanism and the control module are arranged inside the shell, and the control module is electrically connected with the driving unit and is configured to control the driving unit to rotate forwardly or reversely;

the reversing gear mechanism comprises a first drive gear, a first planetary pinion, a second planetary pinion and a planet carrier, the first drive gear comprises a primary gear and an auxiliary gear, wherein the primary gear is driven to rotate by the driving unit, the auxiliary gear is arranged on the primary gear and rotates coaxially with the primary gear, the planet carrier is in pivotal connection with the auxiliary gear through a rotational shaft, the first planetary pinion is pivotally connected to the planet carrier and meshes with the auxiliary gear, the second planetary pinion is pivotally connected to the planet carrier and meshes with the auxiliary gear;

the connecting drive mechanism comprises a second drive gear meshing with the first planetary pinion or the second planetary pinion, and a rack member for fixing the mobile phone camera, the second drive gear is pivotally arranged inside the shell, the rack member is movably connected inside the shell and is configured to extend or retract relative to the shell when it meshes with the second drive gear, wherein the first planetary pinion engages with the second drive gear and meshingly drive the rack member to extend relative to the shell when the driving unit drives the primary gear forwardly, and, wherein the second planetary pinion engages with the second drive gear and meshingly drive the rack member to retract relative to the shell when the driving unit drives the primary gear reversely.

2. A mobile phone camera extension-and-retraction device of claim 1, wherein the planet carrier is a triangular planet carrier, the first planetary pinion and the second gear are pivotally connected to two opposite angles of the triangular planet carrier respectively, and diameters of the first planetary pinion and the second planetary pinion are each larger than a gap between the auxiliary gear and the second drive gear.

3. A mobile phone camera extension-and-retraction device of claim 2, wherein the connecting drive mechanism further comprises a plurality of guiding members disposed side by side inside the shell, and each of the guiding members is pivotally connected to the shell and abuts against the rack member.

4. A mobile phone camera extension-and-retraction device of claim 2, wherein the driving unit comprises an electric motor, a worm connected to a spindle of the electric motor, and a third drive gear meshing with the worm, wherein the third drive gear further meshes with the primary gear.

5. A mobile phone, wherein the mobile phone comprises the mobile phone camera extension-and-retraction device of claim 2.

6. A mobile phone camera extension-and-retraction device of claim 1, wherein the reversing gear mechanism further comprises a torsional spring member for limiting the planet carrier such that the first planetary pinion and the second planetary pinion are both in non-contact state with the second drive gear, wherein one end of the torsional spring member is connected to the planet carrier, and the other end of the torsional spring member is connected to the shell.

7. A mobile phone camera extension-and-retraction device of claim 6, wherein the connecting drive mechanism further comprises a plurality of guiding members disposed side by side inside the shell, and each of the guiding members is pivotally connected to the shell and abuts against the rack member.

8. A mobile phone camera extension-and-retraction device of claim 6, wherein the driving unit comprises an electric motor, a worm connected to a spindle of the electric motor, and a third drive gear meshing with the worm, wherein the third drive gear further meshes with the primary gear.

9. A mobile phone, wherein the mobile phone comprises the mobile phone camera extension-and-retraction device of claim 6.

10. A mobile phone camera extension-and-retraction device of claim 1, wherein the second drive gear comprises a first sub gear and a second sub gear arranged on the first sub gear and rotates coaxially with the first sub gear, the first sub gear is engaged with the first planetary pinion or engaged with the second planetary pinion, and the second sub gear is meshed with the rack member.

11. A mobile phone camera extension-and-retraction device of claim 10, wherein the rack member comprises a rack body meshed with the second sub gear, and the rack body is provided with a fixing portion for fixing the mobile phone camera.

12. A mobile phone camera extension-and-retraction device of claim 11, wherein the connecting drive mechanism further comprises a plurality of guiding members disposed side by side inside the shell, and each of the guiding members is pivotally connected to the shell and abuts against the rack member.

13. A mobile phone camera extension-and-retraction device of claim 11, wherein the driving unit comprises an electric motor, a worm connected to a spindle of the electric motor, and a third drive gear meshing with the worm, wherein the third drive gear further meshes with the primary gear.

14. A mobile phone camera extension-and-retraction device of claim 10, wherein the connecting drive mechanism further comprises a plurality of guiding members disposed side by side inside the shell, and each of the guiding members is pivotally connected to the shell and abuts against the rack member.

15. A mobile phone camera extension-and-retraction device of claim 10, wherein the driving unit comprises an electric motor, a worm connected to a spindle of the electric motor, and a third drive gear meshing with the worm, wherein the third drive gear further meshes with the primary gear.

16. A mobile phone camera extension-and-retraction device of claim 1, wherein the connecting drive mechanism further comprises a plurality of guiding members disposed side by side inside the shell, and each of the guiding members is pivotally connected to the shell and abuts against the rack member.

17. A mobile phone camera extension-and-retraction device of claim 1, wherein the driving unit comprises an electric motor, a worm connected to a spindle of the electric motor, and a third drive gear meshing with the worm, wherein the third drive gear further meshes with the primary gear.

18. A mobile phone camera extension-and-retraction device of claim 17, wherein the third drive gear comprises a first auxiliary gear and a second auxiliary gear arranged on the first auxiliary gear and rotates coaxially with the first auxiliary gear, wherein the first auxiliary gear meshes with the worm, and the second auxiliary gear meshes with the primary gear.

19. A mobile phone camera extension-and-retraction device of claim 18, wherein the first auxiliary gear is a first auxiliary gear with skew gear teeth.

20. A mobile phone, wherein the mobile phone comprises the mobile phone camera extension-and-retraction device of claim 1.

\* \* \* \* \*